J. W. LOWE.
Horse Hay-Forks.
No. 143,170. Patented September 23, 1873.
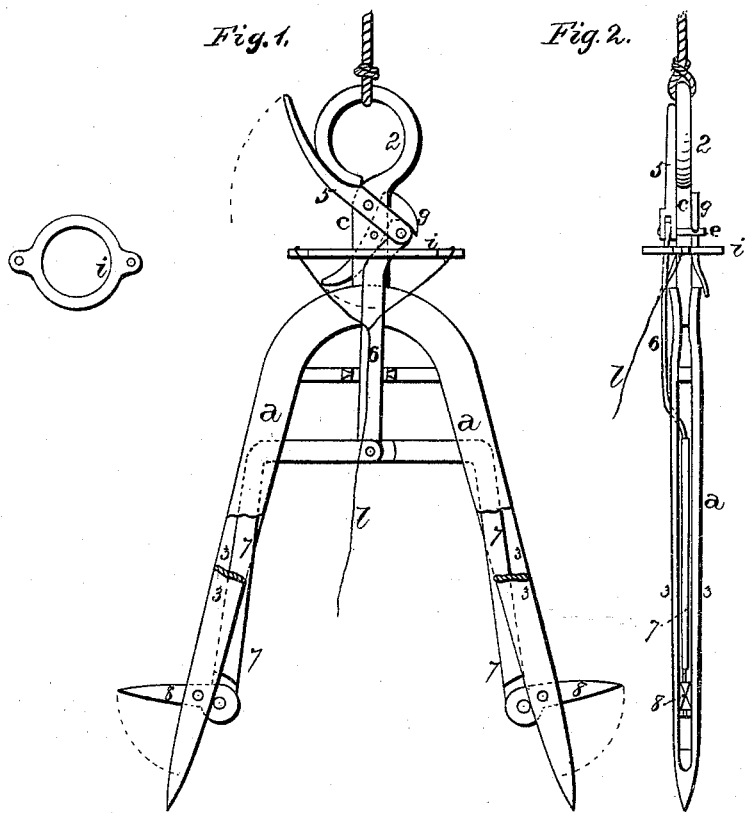
WITNESSES.
Henry N. Miller
F. A. Lehmann
INVENTOR
J. W. Lowe
per
Alexander A. ...
By
Attorneys.

UNITED STATES PATENT OFFICE.

JOHN W. LOWE, OF ASHLAND, OHIO.

IMPROVEMENT IN HORSE HAY-FORKS.

Specification forming part of Letters Patent No. 143,170, dated September 23, 1873; application filed August 21, 1873.

*To all whom it may concern:*

Be it known that I, JOHN W. LOWE, of Ashland, in the county of Ashland and in the State of Ohio, have invented certain new and useful Improvements in Horse Hay-Fork; and do hereby declare that the following is a full, clear, and exact description thereof, reference being had to the accompanying drawings and to the letters of reference marked thereon, making a part of this specification.

The nature of my invention relates to an improvement in horse hay-forks; and it consists in the arrangement and combination of parts, which will be more fully described hereafter.

Figure 1 is a side elevation of my invention. Fig. 2 is an edge view of the same. Fig. 3 is a plan view of the tripping device.

$a$ represents the tines of the fork, which consist of the two bars 3, secured together at their lower ends, and held a suitable distance apart above the pointed ends to allow the operating-levers to work freely between them. Between these bars, at the top, is fastened the bar $c$, having the ring 2 formed upon its top, in which the elevating-rope is attached. Pivoted to the side of this bar is the lever 5, having secured to its shorter end the connecting-rod 6, which transmits the motion of the lever to the levers 7, which, in turn, operate the forks 8. These forks consist of short pointed bars, fulcrumed between the bars 3, and which can be opened out, as shown in Fig. 1, so as to bind the hay to the tines, or can be closed downward, so as to entirely disappear. The pivot-pin, which binds the lever 5 and connecting-rod 6 together, extends outward, so as to form a catch, $e$, over which, when the lever is raised upward, as shown in Fig. 1, the hook $g$ catches, and holds the lever in this position—supporting the whole weight of straw or hay upon the outspread forks. Over the bar $c$ is passed the ring $i$, having an ear at each end, in which the tripping-rope $l$ is fastened.

After the load has been elevated to the desired point by pulling on this rope, the ring presses down upon the lower end of the hook, which causes it to release the catch, when the load instantly falls.

Having thus described my invention, I claim—

The combination of the tines $a$, bar $c$, lever 5, hook $g$, catch $e$, connecting-rod 6, lever 7, forks 8, ring $i$, and tripping-rope $l$, all combined and arranged to operate as shown and described.

In testimony that I claim the foregoing I have hereunto set my hand this 4th day of August, 1873.

J. W. LOWE.

Witnesses:
CHRISTOPHER C. WARNER,
J. B. CHARLES.